Nov. 17, 1936. R. G. SCOTT 2,061,487
TESTING APPARATUS FOR ELECTRIC APPLIANCES
Filed Sept. 1, 1933
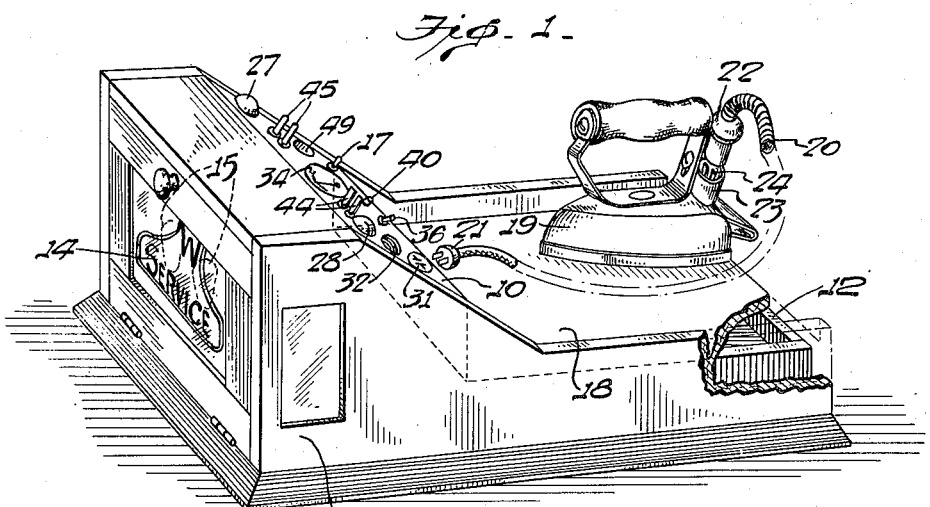
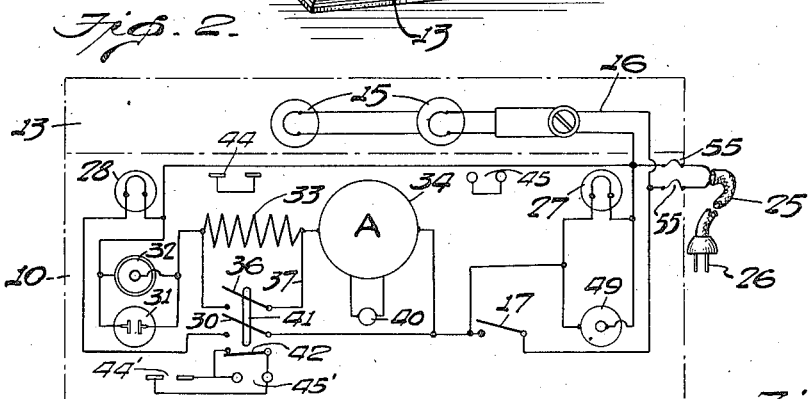
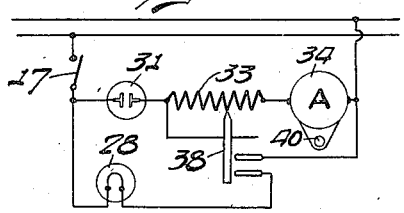
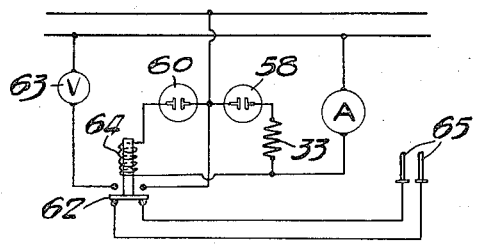
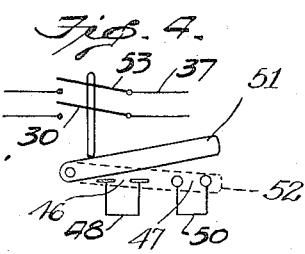
Inventor
Richard G. Scott
By H. H. Snelling
Attorney Patented Nov. 17, 1936

2,061,487

UNITED STATES PATENT OFFICE 2,061,487

TESTING APPARATUS FOR ELECTRIC APPLIANCE

Richard G. Scott, Corsicana, Tex.

Application September 1, 1933, Serial No. 687,896

19 Claims. (Cl. 175—183)

This invention relates to systems for testing electrical appliances especially electric irons, toasters, curling irons, fans and other appliances either portable or stationary, as well as the connecting cords for such devices. The primary object is the provision of a simple circuit including a convenience outlet and ammeter in which the device to be tested may be connected and tested accurately for all faults with ease and perfect safety to the operator and without danger of blowing out the fuses in the supply line.

A particular object is to provide a test panel which may be used by any unskilled person with accurate results. For example, in many electrical supply stores there are clerks and salespeople who know almost nothing about electric circuits and to whom most test panels are a complicated maze of buttons, switches and plugs which are to them impossible of intelligent operation for any useful purpose. On the other hand, many electrical stores and repair shops are equipped with a make-shift circuit usually consisting of a convenience receptacle and a lamp bulb in series which provides means for making only the simplest tests and in an unsatisfactory manner; such a system will indicate when a circuit under test has a wide open break or a dead short but will not indicate a partial break or a partial short and furthermore cannot be used as a measuring device for checking the consumption of current by the appliance. It is an object of this invention to provide a test panel that may be understood by all classes of customers that come into an electrical supply store whereby new appliances may be strikingly demonstrated as to current consumption and compared with old appliances which may be brought in for repairs.

A further object of this invention is to provide a system whereby the actual consumption of current of an appliance can be checked against the amount indicated by the manufacturer's label on the appliance thereby serving as a means for convincing customers of the false economy in buying cheap lamps or appliances.

A particular object of the invention is to provide a test panel in combination with a cabinet to be placed on the counter in sales rooms and shops and in which new parts such as heating elements may be kept at hand for testing and comparison with old parts of appliances brought in for repairs, whereby the customer may see for himself and understand the necessity of a replacement.

In carrying out the above and other objects of my invention I provide a cabinet adapted to be placed on a counter or work bench and having a preferably slanting panel-like top on which is mounted an ammeter, a convenience outlet, an impedance and a switch all connected in series with a flexible conductor cord provided with the usual plug for engagement with a supply outlet. Connected across the impedance is a second switch for shunting out the impedance and also for simultaneously completing a circuit thru a voltage indicator or pilot light which indicates when the impedance has been removed from the test circuit. On the panel there is also mounted one or more pairs of short circuited terminals for receiving the plug end of the appliance cord, the other end of which is inserted in the convenience outlet; I prefer that some means be provided for preventing the contact of the plug end with the short circuited terminals before the removal of the impedance thus making it impossible to impress full voltage on the ammeter.

In the drawing:—

Figure 1 is a perspective view of the panel partly in section showing its mounting on a cabinet.

Figure 2 is a wiring diagram.

Figures 3 and 4 are details of modifications.

Figure 5 is a modification requiring no manually operated switches.

Although the test panel may be mounted on a wall, I prefer to build it into the cover 10 of a counter cabinet 11 which is provided with a drawer 12 as a handy place for tools and parts used in testing and repairing the appliances. In the rear of the cabinet is a glassed-in compartment 13 on the windows of which are advertisements 14 or signs directing attention to the test panel; within the compartment are one or more lamps 15 which are preferably in a flasher circuit 16. This circuit may or may not be controlled by the main switch 17 of the test set depending on what indicia is put on the windows. The space 18 just below the slanting panel provides a rest for the appliance under test, e. g., an electric iron 19 with its cord 20 provided with an attachment plug 21 for engagement in the usual convenience outlet and appliance plug 22 for insertion into the guard 23 within which are the flat or round prongs 24.

The test set is provided with an attachment cord 25 having an attachment device such as the pronged plug 26 for connection with the source of supply which is usually 110 volts and 60 cycle alternating current although it may be any other source such as dry cells, storage batteries or generator. The cord leads to the switch 17 from which the conductors branch into a main test circuit, a flasher circuit 16 which may be omitted, an indicator circuit including the lamp 27 and connected to be energized whenever the switch 17 is closed, and finally the indicator circuit containing a lamp 28 and a switch blade 30. It is preferred that lamps 27 and 28 be of different colors such as green and red. A voltmeter may be used in place of lamp 28.

The main test circuit consists principally of one or more convenience outlets 31 and 32, an impedance 33 and an ammeter 34 or other current indicating device. The provision of two or more outlets is in order to accommodate different types of attachment plugs for example, outlet 31 will take either parallel or in-line blades while outlet 32 will take the now practically obsolete screw plugs as well as screw base lamps; of course other types of terminals or outlets may be provided as required by the kind of appliances or instruments to be tested. The impedance 33 is preferably an inductance coil where the set is to be connected to alternating current supply lines although obviously it may be any kind of electric load such as a non-inductive resistance or a condenser or any combination of these; I find that if the impedance has an effective resistance of such value that the electric load is approximately equal to that of the device being tested, the test is greatly facilitated for example, most electric irons use about 5 amperes and therefore by giving the impedance 33 an effective resistance equal to that of the iron the current will be cut from 5 amperes to 2.5 amperes or when switch 36 of the shunt 37 is closed the current through the ammeter should double. In order to make the resistance of the appliance and of the impedance 33 nearly equal, I may provide a variable shunt 38 as shown diagrammatically in Figure 3 but for practical commercial purposes such a refinement is found unnecessary and even confusing to the average operator who is more often than not a clerk that knows nothing about electric circuits, for this reason when the variable shunt 38 is provided it is clearly marked with a scale graduated in "appliances" rather than in ohms or amperes, e. g., one graduation should be marked Flat Irons, another Curling Irons and another Heating Pads, etc., depending upon the ampere load usually taken by these appliances. The ammeter is preferably of the well known double scale type in which the holding down of a spring pressed button 40 changes the scale from say a 1–10 ampere scale to a 0.1–1 ampere scale so that an appliance such as a curling iron which draws but a small amount of current may be tested with the same accuracy as a flat iron or other device taking a relatively large amount of current.

Between the switch blade 30 and switch 36 is provided means such as the member 41 which causes the indicator circuit to close whenever the shunt 37 is closed. This member 41 may be extended so as to engage and open switch 42 of the short circuit across one or both pairs of blades 44' and 45' whereby these terminals are prevented from being shorted while the shunt 37 is closed. However, the movable contact in the switch 42, like most movable contacts, is a source of trouble due to burning out and therefore I prefer to provide pairs of blades 46 and 47 solidly and permanently short circuited at 48 and 50, as in Figure 4 and pivot a member 51 to be swung over these blades, as at 52, whenever the switches 53 and 30 are moved to close the shunt 37 and the indicator circuit, thus positively to prevent either the closing of the shunt when a plug engages one or the other pair of blades or positively to prevent the engagement of the blades by the plug when the shunt is closed. Where the modification of Figure 4 is used the blades should be placed in sockets in the panel so that the member 42 can lie flat on the panel and swing over and close the sockets.

Fuses 55 should be provided in order to protect the test circuits as well as the house fuses. The smooth socket 49 provides a lamp testing means.

In Figure 5 is shown an arrangement in which two identical convenience outlets 58 and 60 are provided, the outlet 58 being in series with load 33 and the outlet 60 being shunted around the load but in series with a current operated switch 62 which when energized closes the circuit of the voltage responsive device 63 which may be either a voltmeter or lamp; the coil 64 has a negligible resistance. In closing the circuit of the indicator 63 the switch 62 opens the short circuit of prongs 65. This system obviates the use of any manually operated switch except possibly a main switch. In testing the appliance the cord plug 21 is first connected to outlet 58 for a cord test and then pulled out and inserted in outlet 60 for the iron test.

In testing an appliance with my invention the main switch 17 is first closed to energize the test set, then the connector cord of the appliance, for example, a cord 20 of the flat iron 17, is connected to the convenience outlet 31 or 32, depending upon the type of attachment plug 22, and with this connection the ammeter 34 should be observed for an indication of a short circuit in the cord. If no indication is given the iron-cord plug 22 is pushed down over the short circuited terminals, i. e., either the flat prongs 44 or the round prongs 45, depending upon the type of plug, and if there is no break in the cord the ammeter should read 5 amperes or whatever amount taken by the impedance or load 33. If there is a break no current will flow unless the cord is shaken and twisted until the broken ends are brought together which is the usual method of locating breaks in covered cords. Next the iron cord plug 22 is removed from the shorted prongs and if the cord is good the plug is inserted into its socket guard 23 where the plug terminals engage prongs 24, i. e., the terminals of the iron. If the heating element of the iron is in good condition the ammeter should read 2 or 3 amperes with the shunt 37 open and 5 or 6 amperes with it closed; a reading greater or less than the normal or labeled amperage will indicate that the iron should either be repaired or exchanged for a better iron. The testing of other appliances will be like that of the iron except that where the cord is permanently connected to the appliance the cord short circuit test will usually be omitted unless other tests indicate a break in the cord.

In testing heating pads provided with two or three heats such as "warm", "medium", or "hot", the cord test is first made as just described, then the pad is connected to the set and two tests are made for each heat, i. e., first a test with the shunt open and then a test with it closed.

What I claim is:

1. In a device for testing electrical appliances, means for connecting said device to a source of current, a circuit including an outlet receptacle, an impedance and a current indicator in series across said connecting means, a voltage responsive indicator, and means for simultaneously connecting said voltage responsive indicator in parallel with said circuit and short circuiting said impedance.

2. In a device for testing electrical appliances, a circuit including an impedance, a current responsive device, and a convenience outlet connected in series, means for connecting said circuit to a source of E. M. F., means for short circuiting said impedance, and means actuated by said short circuiting means for indicating said short circuit.

3. In an electrical test panel for testing household appliances, comprising a convenience outlet, a load adapted to draw a current substantially equal to that taken by the appliance to be tested, a current indicator, means for connecting said outlet, said load and said indicator in series with a source of current, means for shunting out said load, and means actuated by said shunting means for indicating when said load is shunted.

4. In a test panel for testing household appliances such as electric irons, toasters, heating pads, etc., said panel comprising a convenience outlet, an impedance, and a current responsive device connected in series, means for connecting said series connection to a source of current, means for shunting said impedance at will and means for indicating when said impedance is removed from circuit.

5. In a system for testing electrical appliances, a circuit including in series an impedance, an ammeter, a pair of test terminals and a pair of terminals by which a source of E. M. F. may be connected in said circuit and a pair of short circuited terminals spaced from said test terminals and source terminals whereby a device to be tested may be connected between said test terminals and said short circuited terminals.

6. In a device for testing appliance cords of the type provided with an attachment plug and an appliance plug, said device comprising a circuit consisting of an impedance, a current responsive device and a convenience outlet connected in series, means for connecting said circuit to a source of current, and a pair of short circuited terminals spaced from said convenience outlet and adapted to be engaged by the appliance plug of an appliance cord whereby a cord may be tested for open circuit by inserting the attachment plug in the convenience outlet and connecting the appliance plug to said terminals.

7. An electrical appliance testing cabinet comprising a panel forming the cover of said cabinet, an electrical load device within the cabinet, an ammeter secured to said panel, an outlet receptacle secured to said panel, a main switch on said panel, conductors connected to said switch and leading from said cabinet for connection to a source of current, conductors within the cabinet connecting said device, said ammeter and said receptacle in series with said switch, a double pole switch and a lamp socket on said panel, conductors within the cabinet connecting said double pole switch to the terminals of said load device, conductors within the cabinet connecting said double pole switch to said socket and to the first mentioned switch whereby closing of said double pole switch simultaneously closes a circuit through the lamp socket and short circuits said load device.

8. The testing device of claim 7 in which a second lamp socket is mounted on said panel and means are provided for connecting said socket to said main switch whereby the closing of this switch connects the second lamp socket to the source of current.

9. The testing device of claim 7 in which a pair of terminals are mounted on the panel for engagement with an appliance plug, and means within the cabinet for permanently short circuiting said terminals.

10. An electrical appliance testing device comprising a panel, two main conductors and an impedance mounted on the panel, a convenience receptacle, a current responsive indicator and a voltage responsive indicator mounted on the panel, conductors connecting the receptacle, the impedance and the current responsive indicator in series between the main conductors, and means for simultaneously connecting the voltage responsive indicator across the main conductors and short circuiting the impedance.

11. The device of claim 10 in which one or more pairs of short circuited terminals are mounted on the panel and spaced from the other elements, each pair of terminals being arranged to engage the terminals carried by a standard appliance plug whereby when testing appliance cords provided with a receptacle plug and an appliance plug the former may be inserted in said receptacle and the latter may be connected to said short circuited terminals.

12. In a panel for testing electrical appliances, a circuit including an electrical load and an ammeter connected in series, a voltage responsive indicator, means for connecting an appliance in series with said circuit, means for shunting an appliance around said load, and means responsive to said shunting connection for connecting said voltage responsive indicator across said circuit.

13. The device of claim 12 in which said means for connecting an appliance in series includes a pair of plug terminals mounted on the panel and connected to said circuit for engaging the terminals of the appliance cord of an appliance to be tested and a pair of short circuited terminals mounted on said panel and spaced from said circuit for connection with the opposite terminals of the appliance cord to short circuit the same thereby providing for the substitution of the cord in the circuit for the appliance and thus providing means for testing appliance cords.

14. The device of claim 12 in which a pair of short circuited terminals are mounted on said panel spaced from said connecting means for testing appliance cords, and means operated by said shunting connection for opening the short circuit of said terminals whereby preventing the terminals being shorted while said load is shunted.

15. A test panel for testing appliance cords of the type provided with an attachment plug and an appliance plug, said panel comprising a circuit consisting of an impedance, an ammeter and a convenience outlet connected in series, means for connecting said circuit to a source of current, a pair of short circuited terminals mounted near said circuit and adapted to be engaged by the appliance plug of an appliance cord, a switch for shunting said impedance, and means for preventing the engagement of the short circuited terminals by an appliance plug while said switch is closed.

16. The device of claim 15 in which said preventing means consists of a member movable to cover or uncover said terminals, and a switch opening element adapted to be engaged by said member to open said switch upon the member being moved to uncover said terminals.

17. In a system for testing electrical appliances, a circuit including in series an impedance, an ammeter, a pair of test terminals and a pair of terminals by which a source of E. M. F. may be connected in said circuit, a pair of short circuited terminals spaced from said test terminals and source terminals whereby a device to be tested may be connected between said test terminals and said short circuited terminals, means for shunting said impedance, and means operated by said shunting means for opening the short circuit of said terminals whereby said impedance can be shunted only when said terminals are open circuited.

18. In a device for testing electrical appliances, a circuit including an impedance, a current responsive device, and a convenience outlet connected in series, means for connecting said circuit to a source of E. M. F., means for varying said impedance, and means actuated by said varying means for indicating when said impedance is reduced substantially to zero.

19. A test panel for testing appliance cords of the type provided with an attachment plug and an appliance plug, said panel comprising a circuit consisting of an impedance, an ammeter and a convenience outlet connected in series, means for connecting said circuit to a source of current, a pair of short circuited terminals mounted near said circuit and adapted to be engaged by the appliance plug of an appliance cord, a switch for shunting said impedance, the handle of said switch when closed being so close to the short circuited terminals as to prevent the engagement of the appliance plug therewith as long as the switch is closed, said arrangement also preventing the closing of the switch as long as an appliance plug engages the short circuited terminals.

RICHARD G. SCOTT.